US010893469B2

(12) United States Patent
Müller

(10) Patent No.: US 10,893,469 B2
(45) Date of Patent: Jan. 12, 2021

(54) NETWORK ACCESS OF A WIRELESS DEVICE

(71) Applicant: Telefonaktiebolaget LM Ericsson (publ), Stockholm (SE)

(72) Inventor: Walter Müller, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 292 days.

(21) Appl. No.: 14/915,994

(22) PCT Filed: Feb. 16, 2016

(86) PCT No.: PCT/EP2016/053273
§ 371 (c)(1),
(2) Date: Mar. 2, 2016

(87) PCT Pub. No.: WO2017/140349
PCT Pub. Date: Aug. 24, 2017

(65) Prior Publication Data
US 2018/0063777 A1 Mar. 1, 2018

(51) Int. Cl.
H04W 48/18 (2009.01)
H04W 88/06 (2009.01)
H04W 88/10 (2009.01)
H04W 72/14 (2009.01)
H04W 74/08 (2009.01)

(52) U.S. Cl.
CPC ....... H04W 48/18 (2013.01); H04W 74/0833 (2013.01); H04W 72/14 (2013.01); H04W 88/06 (2013.01); H04W 88/10 (2013.01)

(58) Field of Classification Search
None
See application file for complete search history.

(56) References Cited

U.S. PATENT DOCUMENTS 7,408,901 B1    8/2008  Narayanabhatla
8,380,200 B1 *  2/2013  Spitzer ............. H04W 36/0066
                                                 370/331
2011/0280227 A1  11/2011  McCann et al.
(Continued)

FOREIGN PATENT DOCUMENTS

RU    2463743 C2    10/2012
RU    2469512 C2    12/2012
(Continued)

OTHER PUBLICATIONS

Huawei, "TP for TR 36.889 V0.1.0 Study on licensed-assisted access using LTE", 3GPP TSG-RAN WG2 Meeting #89bis, Bratislava, Slovakia, Apr. 20, 2015, pp. 1-10, R2-151740, 3GPP.

Primary Examiner — Jeffrey M Rutkowski
Assistant Examiner — Ning Li
(74) Attorney, Agent, or Firm — Coats & Bennett, PLLC

(57) ABSTRACT

There is provided mechanisms for network access of a wireless device to a communications network. A method is performed by the wireless device. The method comprises initiating network access using a first radio access technology to the communications network. The method comprises preparing for receiving at least a response to the network access from a network node in the communications network using at least a second radio access technology different from the first radio access technology.

29 Claims, 9 Drawing Sheets

(56) References Cited

U.S. PATENT DOCUMENTS

| | | | | |
|---|---|---|---|---|
| 2013/0088983 A1* | 4/2013 | Pragada | ............... | H04W 16/14 370/252 |
| 2014/0161047 A1 | 6/2014 | Pularikkal et al. | | |
| 2015/0063315 A1 | 3/2015 | Yang et al. | | |
| 2015/0173000 A1* | 6/2015 | Basilier | ............... | H04W 48/18 370/329 |
| 2015/0289080 A1* | 10/2015 | Wu | ............... | H04W 4/005 370/329 |
| 2015/0304957 A1* | 10/2015 | Noh | ............... | H04W 52/367 455/522 |
| 2015/0350982 A1* | 12/2015 | Batchu | ............... | H04W 36/14 455/424 |
| 2016/0183323 A1* | 6/2016 | Rahman | ............ | H04W 74/0833 370/329 |
| 2016/0242213 A1* | 8/2016 | Dabeer | ............ | H04W 74/0833 |
| 2016/0270141 A1* | 9/2016 | Sharma | ............... | H04W 76/026 |
| 2016/0278130 A1* | 9/2016 | Uchino | ............... | H04L 5/001 |
| 2016/0285649 A1* | 9/2016 | Luo | ............... | H04L 12/6418 |
| 2016/0285716 A1* | 9/2016 | Pelletier | ............... | H04L 5/0098 |
| 2016/0295629 A1* | 10/2016 | Gubeskys | ......... | H04W 56/0015 |
| 2016/0308635 A1* | 10/2016 | Zhou | ............... | H04W 52/04 |
| 2016/0323916 A1* | 11/2016 | Lee | ............... | H04W 76/10 |
| 2017/0006593 A1* | 1/2017 | Liu | ............... | H04W 16/32 |
| 2017/0034757 A1* | 2/2017 | Yang | ............... | H04W 36/30 |
| 2017/0093480 A1* | 3/2017 | Ijaz | ............... | H04W 72/04 |
| 2017/0111952 A1* | 4/2017 | Choi | ............... | H04L 5/1469 |
| 2017/0118776 A1* | 4/2017 | Yasukawa | ............ | H04W 28/08 |
| 2017/0201998 A1* | 7/2017 | Akiyama | ............ | H04W 16/14 |
| 2018/0020483 A1* | 1/2018 | Lee | ............... | H04W 16/14 |
| 2018/0035436 A1* | 2/2018 | Sharma | ............... | H04W 72/085 |

FOREIGN PATENT DOCUMENTS

| | | | | |
|---|---|---|---|---|
| RU | 2482631 C2 | 5/2013 | | |
| WO | 2012014437 A1 | 10/2012 | | |
| WO | 2012167184 A2 | 12/2012 | | |
| WO | WO 2015/020576 A1 * | 2/2015 | ............ | H04W 74/08 |

* cited by examiner

NETWORK ACCESS OF A WIRELESS DEVICE

TECHNICAL FIELD

Embodiments presented herein relate to methods, a wireless device, network nodes, computer programs, and a computer program product for network access of the wireless device to a communications network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to provide efficient network access for wireless devices served by the communications network.

According to the network access scheme used in Long Term Evolution (LTE) for accessing the communications network when the wireless device is in radio resource control (RRC) idle mode or at RRC re-establishment the wireless device selects only one cell to camp on and then use the downlink (from network to wireless device) frame timing as reference for uplink (from wireless device to network) transmission timing for sending a random access preamble on the uplink. In this respect, the cell is defined by primary and secondary synch signals and cell-specific reference signals as transmitted by a network node in the communications network; each network node may define one or more cells. The occasion in time and frequency resources to use by the wireless device in a particular cell is configured by the communications network and provided to the wireless device via broadcasted system information or via dedicated signaling. If the wireless device reselect to a new cell the wireless device needs to obtain system information or dedicated information (in handover situations) about access configuration before making a random access attempt to that new cell.

LTE supports random access with dedicated pre-ambles in RRC connected mode (also known as Contention Free Random Access (CFRA)) or with contention resolution which is performed after preamble reception and response (also known as Contention Based Random Access (CBRA)) in RRC idle mode or RRC connected mode. The wireless device may also be configured to stepwise increase preamble power (so-called power ramping) for each preamble transmission reattempt in case of no response received from the network to the random access preamble. Back-off mechanisms exists to regulate the random access attempt load.

FIG. 2 is a signalling diagram of an LTE random access procedure between a wireless device (WD) and a network node (NN).

S501: The wireless device transmits a random access preamble to the network node. The random access preamble comprises a preamble signature which could be a dedicated signature, a non dedicated signature, or a signature belonging to a specific coverage group (which the wireless device e.g., selects from a specific signature group due to coverage situation).

S502: The network node transmits a random access response to the wireless device. The random access response comprises a pre-amble index indicating which preamble signature the network node responded to. The random access response comprises an uplink grant given to the wireless device for the next message transmitted by the wireless device. The random access response comprises transmission timing advance information for the wireless device.

The wireless device is considered contention resolved after receiving a matching preamble index in case of dedicated preamble.

S503: The wireless device transmits protocol layer 2 and/or protocol layer 3 (L2/L3) messages and user data if grant size allows that to the network node. Examples of such L2/3 messages are uplink buffer status report (BSR) of the wireless device, power headroom report (PHR) of the wireless device, a Cell Radio Network Temporary Identifier (C-RNTI) which is randomly selected by the wireless device or allocated by the network node, RRC message segment(s) or even user data in case of enough uplink grant given in step S502.

S504: The network node transmits an uplink grant or downlink scheduling to the wireless device. The uplink grant size depends on the BSR and the PHR received in step S503. The C-RNTI from step S503 is by the network node used to address the wireless device on a Physical downlink Control Channel (PDCCH). The wireless device is considered contention resolved if the C-RNTI matches from step S503 in case of non dedicated preamble, i.e. a contention based random access. Optionally, the network node schedules downlink L2/L3/user data to the wireless device.

There is still a need for improved mechanisms for network access of a wireless device.

SUMMARY

An object of embodiments herein is to provide efficient mechanisms for network access of a wireless device.

According to a first aspect there is presented a method for network access of a wireless device to a communications network. The method is performed by the wireless device. The method comprises initiating network access using a first radio access technology to the communications network. The method comprises preparing for receiving at least a response to the network access from a network node in the communications network using at least a second radio access technology different from the first radio access technology.

According to a second aspect there is presented a wireless device for network access of the wireless device to a communications network. The wireless device comprises processing circuitry. The processing circuitry is configured to cause the wireless device to initiate network access using a first radio access technology to the communications network. The processing circuitry is configured to cause the wireless device to prepare for receiving at least a response to the network access from a network node in the communications network using at least a second radio access technology different from the first radio access technology.

According to a third aspect there is presented a wireless device for network access of the wireless device to a communications network. The wireless device comprises processing circuitry and a computer program product. The computer program product stores instructions that, when executed by the processing circuitry, causes the wireless device to perform operations, or steps. The operations, or steps, involve the wireless device to initiate network access using a first radio access technology to the communications network. The operations, or steps, involve the wireless device to prepare for receiving at least a response to the network access from a network node in the communications network using at least a second radio access technology different from the first radio access technology.

According to a fourth aspect there is presented a wireless device for network access of the wireless device to a communications network. The wireless device comprises an initiate module configured to initiate network access using a first radio access technology to the communications network. The wireless device comprises a prepare module configured to prepare for receiving at least a response to the network access from a network node in the communications network using at least a second radio access technology different from the first radio access technology.

According to a fifth aspect there is presented a computer program for network access of a wireless device to a communications network, the computer program comprising computer program code which, when run on processing circuitry of the wireless device, causes the wireless device to perform a method according to the first aspect.

According to a sixth aspect there is presented a method for network access of a wireless device to a communications network. The method is performed by a network node using a first radio access technology. The method comprises receiving an initiation for network access to the communications network from a wireless device using the first radio access technology. The method comprises forwarding the initiation for network access to another network node, said another network node using a second radio access technology different from the first radio access technology for communications with the wireless device.

According to a seventh aspect there is presented a network node for network access of a wireless device to a communications network. The network node comprises processing circuitry. The processing circuitry is configured to cause the network node to receive an initiation for network access to the communications network from a wireless device using the first radio access technology. The processing circuitry is configured to cause the network node to forward the initiation for network access to another network node, said another network node using a second radio access technology different from the first radio access technology for communications with the wireless device.

According to an eighth aspect there is presented a network node for network access of a wireless device to a communications network. The network node comprises processing circuitry and a computer program product. The computer program product stores instructions that, when executed by the processing circuitry, causes the network node to perform operations, or steps. The operations, or steps, involve the network node to receive an initiation for network access to the communications network from a wireless device using the first radio access technology. The operations, or steps, involve the network node to forward the initiation for network access to another network node, said another network node using a second radio access technology different from the first radio access technology for communications with the wireless device.

According to a ninth aspect there is presented a network node for network access of a wireless device to a communications network. The network node comprises a receive module configured to receive an initiation for network access to the communications network from a wireless device using the first radio access technology. The network node comprises a forward module configured to forward the initiation for network access to another network node, said another network node using a second radio access technology different from the first radio access technology for communications with the wireless device.

According to a tenth aspect there is presented a computer program for network access of a wireless device to a communications network, the computer program comprising computer program code which, when run on processing circuitry of a network node, causes the network node to perform a method according to the sixth aspect.

According to an eleventh aspect there is presented a method for network access of a wireless device to a communications network. The method is performed by a network node using a second radio access technology. The method comprises receiving, from another network node, an initiation for network access to the communications network from a wireless device using a first radio access technology different from the second radio access technology. The method comprises responding to the initiation for network access to the wireless device and using the second radio access technology, thereby enabling network access of the wireless device to the communications network.

According to a twelfth aspect there is presented a network node for network access of a wireless device to a communications network. The network node comprises processing circuitry. The processing circuitry is configured to cause the network node to receive, from another network node, an initiation for network access to the communications network from a wireless device using a first radio access technology different from the second radio access technology. The processing circuitry is configured to cause the network node to respond to the initiation for network access to the wireless device and using the second radio access technology, thereby enabling network access of the wireless device to the communications network.

According to a thirteenth aspect there is presented a network node for network access of a wireless device to a communications network. The network node comprises processing circuitry and a computer program product. The computer program product stores instructions that, when executed by the processing circuitry, causes the network node to perform operations, or steps. The operations, or steps, involve the network node to receive, from another network node, an initiation for network access to the communications network from a wireless device using a first radio access technology different from the second radio access technology. The operations, or steps, involve the network node to respond to the initiation for network access to the wireless device and using the second radio access technology, thereby enabling network access of the wireless device to the communications network.

According to a fifteenth aspect there is presented a network node for network access of a wireless device to a communications network. The network node comprises a receive module configured to receive, from another network node, an initiation for network access to the communications network from a wireless device using a first radio access technology different from the second radio access technology. The network node comprises a respond module configured to respond to the initiation for network access to the wireless device and using the second radio access technology, thereby enabling network access of the wireless device to the communications network.

According to a sixteenth aspect there is presented a computer program for network access of a wireless device to a communications network, the computer program comprising computer program code which, when run on processing circuitry of a network node, causes the network node to perform a method according to the eleventh aspect.

According to a seventeenth aspect there is presented a method for network access of a wireless device to a communications network. The method comprises receiving, by a first network node in the communications network and using a first radio access technology, an initiation for network access to the communications network from the wireless device. The method comprises responding, by a second network node in the communications network and using a second radio access technology different from the first radio access technology, to the initiation for network access to the wireless device, thereby enabling network access of the wireless device to the communications network.

According to an eighteenth aspect there is presented a computer program product comprising a computer program according to at least one of the fifth aspect, the tenth aspect, and the sixteenth aspect and a computer readable storage medium on which the computer program is stored. The computer readable storage medium can be a non-transitory computer readable storage medium.

Advantageously these methods, this wireless device, these network nodes, and these computer programs provide efficient mechanisms for network access of the wireless device.

Further advantageous applicable to these methods, this wireless device, these network nodes, and these computer programs will now be disclosed.

Setup latencies in a communications network with mixed RAT response delay capabilities are reduced.

Multiple connections using different RATs to be setup in parallel during the network access procedure are allowed.

Network access latency reductions are enabled if two or more network nodes with different network access response delay times actually receive the initiation for network access transmitted by the wireless device.

The communications network is enabled to turn on fast response RAT carriers when initiation of network access is received from the wireless device and by that be both lean and provide the fastest possible response.

The communications network is enabled to receive an initiation for network access using one RAT and still be able to select the most suitable RAT to respond and continue with, taking coverage, latency and signal levels into considerations.

The wireless device is enabled to receive multiple responses from non co-located network nodes and select the first received response with good enough quality and discard any other response.

The wireless device is enabled to receive multiple responses and select the first received response with good enough quality and high enough priority and discard any other response.

The wireless device is enabled to transmit one single initiation for network access and be prepared to receive different response using different RATs.

The wireless device is enabled to transmit two or more different initiations for network access to different network nodes using different RATs at roughly the same time and be prepared to receive different response using different RATs.

The wireless device is enabled to priorities a specific RAT if responses from more than one RAT are received within a time window.

Two or more network access procedures using mutually different RATs are allowed to be performed in parallel by that the wireless device is enabled to establish a connection to two or more RATs at roughly the same time.

It is to be noted that any feature of the first, second, third, fourth, fifth, sixth seventh, eight, ninth, tenth, eleventh, twelfth, thirteenth, fourteenth, fifteenth, sixteenth, seventeenth and eighteenth aspects may be applied to any other aspect, wherever appropriate. Likewise, any advantage of the first aspect may equally apply to the second, third, fourth, fifth, sixth, seventh, eight, ninth, tenth, eleventh, twelfth, thirteenth, fourteenth, fifteenth, sixteenth, seventeenth, and/or eighteenth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
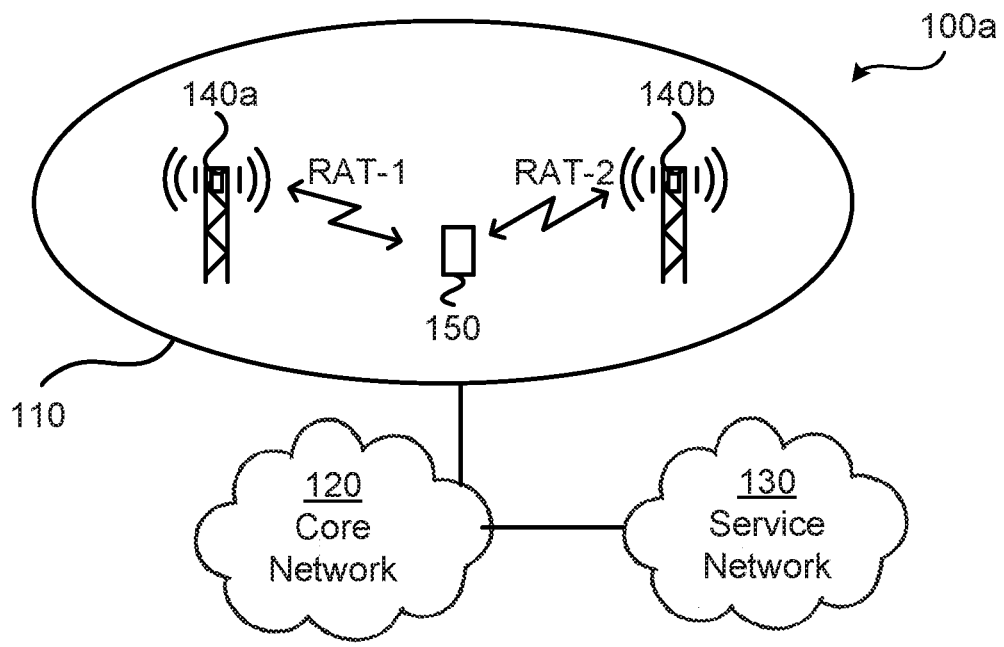
FIGS. 1a and 1b are schematic diagrams illustrating communications networks according to embodiments.
Figure 1B:
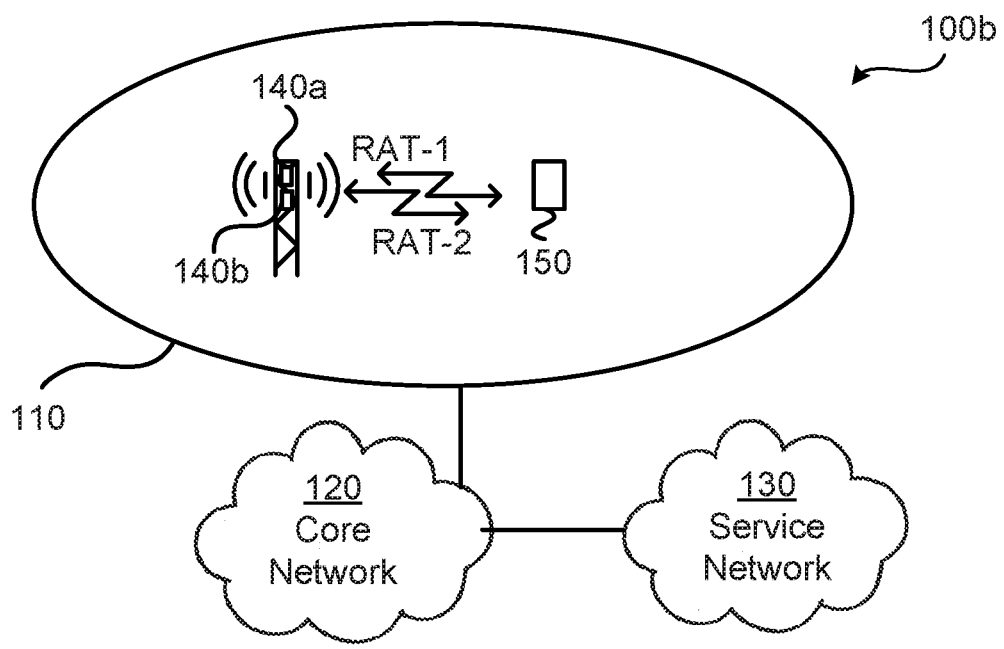
Figure 2:
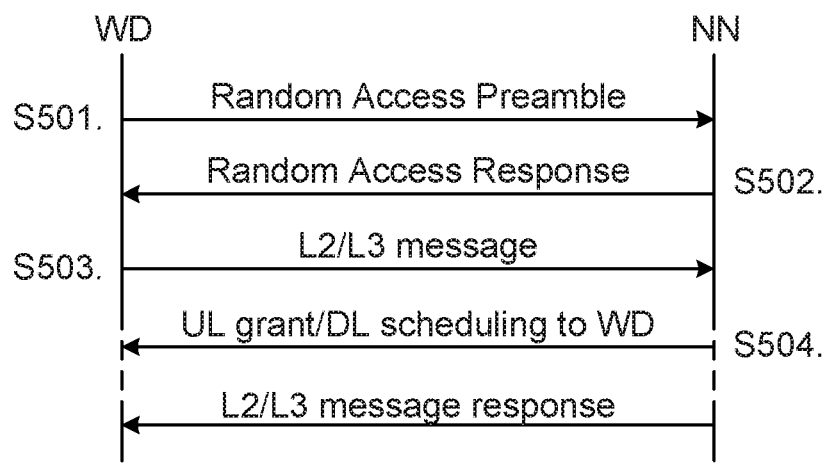
FIG. 2 is a signalling diagram according to prior art.

FIGS. 1a and 1b are schematic diagrams illustrating communications networks 100a, 100b where embodiments presented herein can be applied. Each communications network 100a, 100b comprises a radio access network 110, a core network 120, and a service network 130.

The radio access network 110 comprises network nodes 140a, 140b configured to provide network coverage to wireless devices, as herein represented by the single wireless device 150. As understood by the skilled person the communications network 100 may comprise a plurality of such network nodes 140a, 140b, each providing network coverage to a plurality of wireless devices 150. Each network node 140a, 140b can be provided as a radio base station, base transceiver station, Node B, evolved Node B, or other wireless access point. Each wireless device 150 can be provided as a mobile station, mobile phone, handset, wireless local loop phone, user equipment (UE), smartphone, laptop computer, tablet computer, wireless modem, or network equipped sensor.

The radio access network 110 is operatively connected to the core network 120 which in turn is operatively connected to the service network 130. The wireless device 150 served by at least one of the network nodes 140a, 140b is thereby enabled to access services and exchange data with the service network 130.

LTE network access has above been given as example of a radio access technology RAT. It is foreshadowed that emerging RATs can allow a faster random access response than the random access response issued during a LTE network access procedure. It is foreshadowed that emerging RATs can use higher frequency bands than LTE network access, beam forming and patchy coverage and have shorter latency than LTE network access. Furthermore, the wireless device 150 may not even be aware of that there is to another RAT available to perform network access to.

In this description the term radio access technology shall be understood in a broad sense. For example, as long as the response time differs significantly it is considered as different radio access technologies. For examples, in this sense e.g. LTE Frequency-Division Duplex (FDD) is considered a different radio access technology than LTE Time-Division Duplex (TDD), even if both these RATS are relating to LTE standards.

The communications networks 100a, 100b are assumed to support simultaneous use of at least two radio access technologies, denoted RAT-1 and RAT-2 in FIGS. 1a and 1b for simplicity. Denote one of the network nodes 140a, 140b as a first network node 140a and another one of the network nodes 140a, 140b as a second network node 140b. The first network node 140a provides network access using RAT-1 and the second network node 140b provides network access using RAT-2. In this respect, one example of a radio access technology that could be used as either RAT-1 or RAT-2 is LTE radio access.

The receiver of the network node 140a is assumed to communicate to the transmitter of the network node 140b and the receiver of the network node 140b is assumed to communicate to the transmitter of the network node 140a. In this respect the receiver of the network node 140a is assumed to communicate faster to the transmitter of the network node 140b than the receiver of the network node 140b communicates to the transmitter of the network node 140a. For example, the receiver of the network node 140a can be assumed to communicate without excessive delay to the transmitter of the network node 140b. Further, to achieve lowest possible latency the frame borders and/or transmission time intervals (TTIs) of RAT-1 and Rat-2 can be aligned in a favorable manner in time. But this is not essential. For example, if one of the RATs has much shorter TTI the latency degradation is limited.

In the communications network 100b the network nodes 140a, 140b are co-located (and may hence share hardware components, such as baseband signal processing resources, radio heads, etc.), whereas in the communications network 100a the network nodes 140a, 140b are provide at different locations (and therefore do not share hardware components, such as baseband signal processing resources, radio heads, etc.). In any case, the network nodes 140a, 140b may be regarded as logical units. In this respect, each RAT has its own logical network node 140a, 140b.

LTE network access as disclosed above does not allow for multiple RAT connection to be setup in parallel already during the random access procedure. Further, LTE network access does not allow for random access to be initiated on one RAT but established on another RAT. Further, LTE network access does not allow for random access to be initiated and established on the same or different RAT in parallel without causing extra delay for the fastest RAT.

The embodiments disclosed herein therefore relate to mechanisms for network access of the wireless device 150 to the communications network 100a, 100b. In order to obtain such mechanisms there is provided a wireless device 150, a method performed by the wireless device 150, a computer program product comprising code, for example in the form of a computer program, that when run on processing circuitry of the wireless device 150, causes the wireless device 150 to perform the method. In order to obtain such mechanisms there is further provided a network node 140a, 140b, methods performed by the network node 140a, 140b, and computer program products comprising code, for example in the form of computer programs, that when run on processing circuitry of the network node 140a, 140b, causes the network node 140a, 140b to perform the methods.

Figure 4:
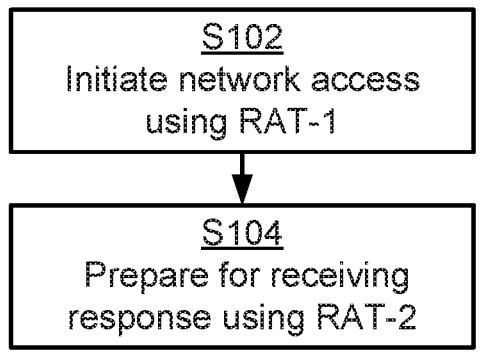
FIGS. 4, 5, 6, 7, 8, 9, and to are flowcharts of methods according to embodiments.
Figure 5:
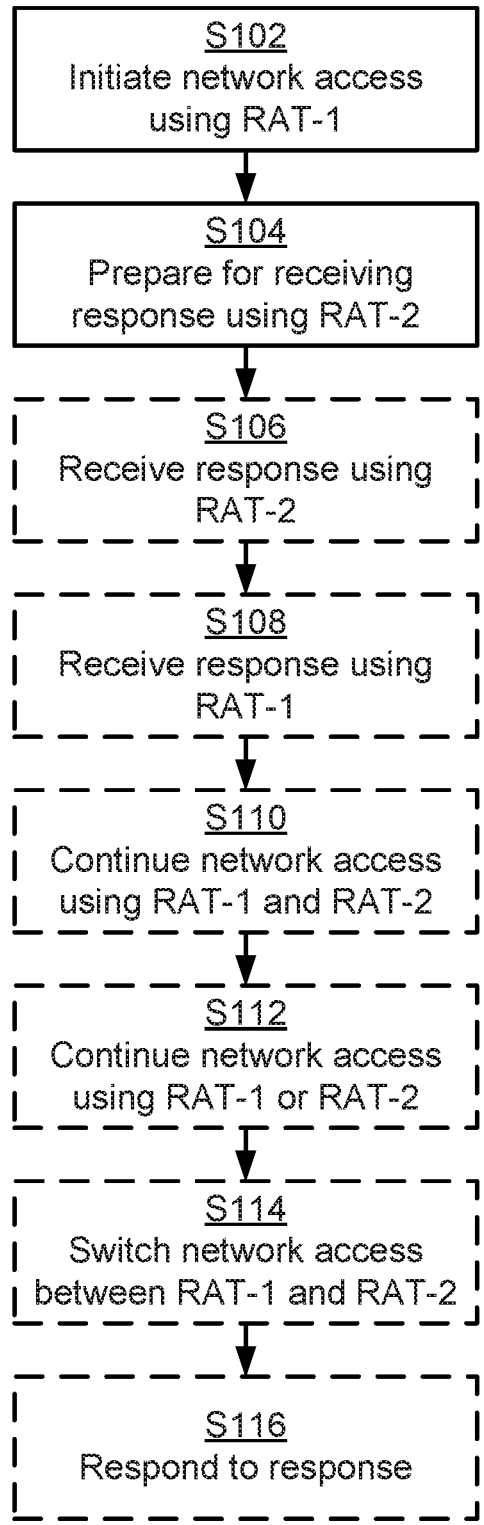

FIGS. 4 and 5 are flow charts illustrating embodiments of methods for network access of the wireless device 150 to the communications network 100a, 100b as performed by the wireless device 150. FIGS. 6, 7, 8, 9, and to are flow charts illustrating embodiments of methods for network access of the wireless device 150 to the communications network 100a, 100b as performed by the network nodes 140a, 140b. The methods are advantageously provided as computer programs 420a, 420b, 420c.

Reference is now made to FIG. 4 illustrating a method for network access of the wireless device 150 to the communications network 100a, 100b as performed by the wireless device 150 according to an embodiment.

S102: The wireless device 150 initiates network access using RAT-1 to the communications network 100a, 100b. In some aspect the wireless device 150 initiates network access using only RAT-1 to the communications network 100a, 100b in step S102. That is, network access is initiated without using RAT-2.

It is assumed that the network access using a RAT-1 is received by the network node 140a in the communications network 100a, 100b using RAT-1. However, the wireless device 150 is configured to also be able to receive a response to the network access using RAT-2 and hence be configured to perform step S104:

S104: The wireless device 150 prepares for receiving at least a response to the network access from the network node 140b in the communications network 100a, 100b using at least RAT-2, where the RAT-2 is different from RAT-1. The wireless device 150 prepares for receiving the response using also RAT-2, despite that RAT-2 was not used when initiating the network access in step S102. Hence, the wireless device 150 prepares for receiving at least a response to the network access from the network node 140b in the communications network 100a, 100b using at least one RAT different from RAT-1 and for which network access was not initiated.

In some aspect the wireless device 150 in step S102 initiates network access in at least one RAT, here defined by RAT-1, and in step S104 prepares for receiving a response in at least one other RAT, here defined by RAT-2. In general terms, the wireless device 150 in step S102 initiates network access using a first set of RATs and in step S104 prepares for receiving at least a response to the network access from the network node 140*b* in the communications network 100*a*, 100*b* using a second set of RATs, where the second set of RATs comprises at least one of RAT not comprised in the first set of RATs.

Reference is now made to FIG. 5 illustrating methods for network access of the wireless device 150 to the communications network 100*a*, 100*b* as performed by the wireless device 150 according to further embodiments. It is assumed that steps S102-S104 are performed as disclosed above.

As disclosed above, the wireless device 150 in step S104 prepares for receiving at least a response to the network access. According to an embodiment the wireless device 150 receives the response using RAT-2.

Hence, according to an embodiment the wireless device 150 is configured to perform step S106:

S106: The wireless device 150 receives the response to the network access from the network node 140*b* using RAT-2.

According to another embodiment the wireless device 150 receives the response using RAT-1. Hence, according to an embodiment the wireless device 150 is configured to perform step S108:

S108: The wireless device 150 receives the response to the network access from a network node 140*a* in the communications network 100*a*, 100*b* using RAT-1.

If two responses are received, i.e., if both steps S106 and S108 are performed, the wireless device 150 can continue both network access procedures. Hence, according to an embodiment the wireless device 150 is configured to perform step S110:

S110: The wireless device 150 continues the network access using both RAT-1 and RAT-2.

Alternatively, the wireless device 150 continues only one of the network access procedures. Hence, according to an embodiment the wireless device 150 is configured to perform step S112:

S112: The wireless device 150 continues the network access using only one of RAT-1 and RAT-2.

There are different ways for the wireless device 150 to determine which of the network access procedures to continue. According to an embodiment, which one of the network access procedure using RAT-1 and the network access procedure using RAT-2 to continue is based on the order in which the responses are received, the mutual priority of RAT-1 and RAT-2, and/or the received signal quality in the received responses (as received in step S106 and in step S108, respectively).

Further, the wireless device 150 can be configured to switch between RAT-1 and RAT-2. Hence, according to an embodiment the wireless device 150 is configured to perform step S114:

S114: The wireless device 150 switches the network access from one of RAT-1 and RAT-2 to the other of RAT-1 and RAT-2. Hence, if the wireless devices 150 has determined to continue the network access procedure using RAT-1, the wireless device 150 is, according to this embodiment, enabled to switch to the network access procedure using RAT-2, and vice versa.

There can be different ways for the wireless device 150 to respond to any of the received responses. According to an embodiment the wireless device 150 is configured to respond to a received response by performing step S116:

S116: The wireless device 150 responds to the response by transmitting user data and/or control signalling to the network node 140*b* and using RAT-2.

Figure 6:
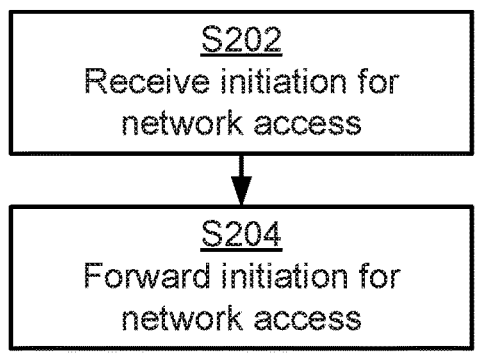

Reference is now made to FIG. 6 illustrating a method for network access of the wireless device 150 to the communications network 100*a*, 100*b* as performed by the network node 140*a* according to an embodiment. The network node 140*a* is assumed to be using RAT-1.

As disclosed above, the wireless device 150 in step S102 initiates network access using RAT-1 to the communications network 100*a*, 100*b*. It is for illustrative purposes assumed that this initiation for network access is to received by the network node 140*a*. Hence, the network node 140*a* is configured to perform step S202:

S202: The network node 140*a* receives an initiation for network access to the communications network 100*a*, 100*b* from a wireless device 150 using RAT-1.

Although the network node 140*a* may or may not respond to the initiation for network access, it alternatively or additionally forwards the initiation for network access and is hence configured to perform step S204:

S204: The network node 140*a* forwards the initiation for network access to another network node 140*b*. This network node 140*b* is configured to use RAT-2, where, as disclosed above, RAT-2 is different from RAT-1, for communications with the wireless device 150.

Figure 7:
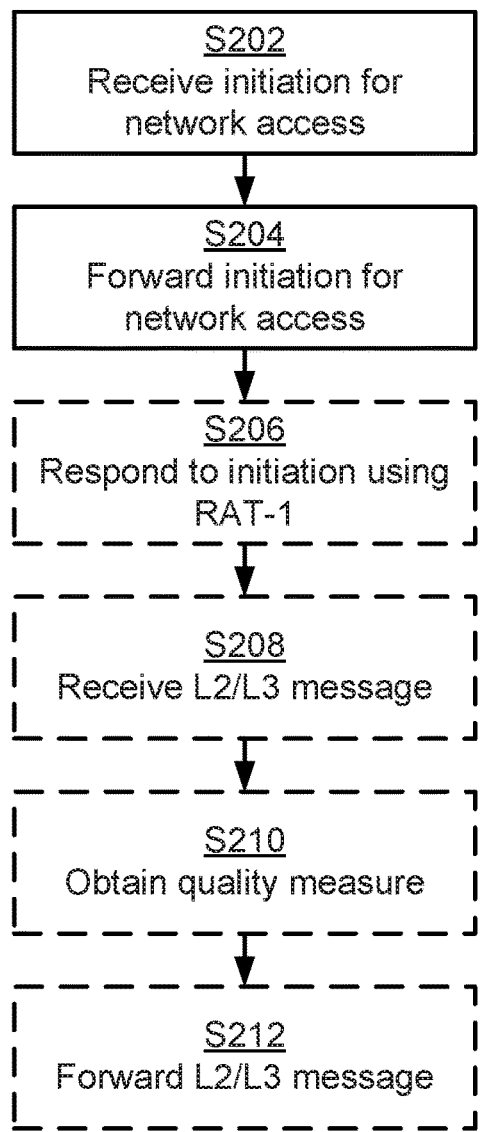

Reference is now made to FIG. 7 illustrating methods for network access of the wireless device 150 to the communications network 100*a*, 100*b* as performed by the network node 140*a* according to further embodiments. It is assumed that steps S202-S204 are performed as disclosed above.

There may be different ways for the network node 140*a* to forward the initiation for network access to the network node 140*b*. As in FIG. 1*a* the network node 140*a* and the network node 140*b* could be provided at different locations. The network node 140*a* and the network node 140*b* could then be operatively connected using the so-called X2 interface or a similar node external interface. Hence, according to an embodiment the initiation for network access is forwarded on the X2 interface. As in FIG. 1*a* the network node 140*a* and the network node 140*b* could be co-located. The network node 140*a* and the network node 140*b* could then be separated by a logical interface. An example of a logical interface is an internal interface. Hence, according to an embodiment the initiation for network access is forwarded on this internal interface.

As discloses above, the network node 140*a* may or may not respond to the initiation for network access. According to an embodiment the network node 140*a* indeed responds to the initiation for network access and is hence configured to perform step S206:

S206: The network node 140*a* responds, using RAT-1, to the initiation for network access to the wireless device 150. The network node 140*a* thereby enables network access of the wireless device 150 to the communications network 100*a*, 100*b*.

When network access of the wireless device 150 has been enabled, the wireless device 150 can transmit L2/L3 messages (and user data if allowed by the grant size) to the network node 140*a*. Hence, according to an embodiment the network node 140*a* is configured to perform step S208:

S208: The network node 140*a* receives a protocol layer 2 or protocol layer 3 (L2/L3) message from the wireless device 150 in response to having responded to the initiation in step S206.

The L2/L3 message can then be forwarded as in step S212:

S212: The network node 140*a* forwards the L2/L3 message to the network node 140*b*.

The network node 140*a*, in some aspects, includes quality measure of the received response in the forwarded response. Hence, according to an embodiment the network node 140*a* is configured to perform step S210:

S201: The network node 140*a* obtains a quality measure of the received L2/L3 message. The L2/L3 message forwarded to the network node 140*b* then comprises the quality measure. Step S210 is hence performed before step S212.

Figure 8:
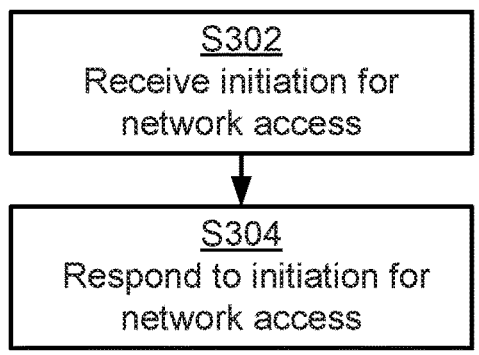

Reference is now made to FIG. 8 illustrating a method for network access of the wireless device 150 to the communications network 100*a*, 100*b* as performed by the network node 140*b* according to an embodiment. The network node 140*b* is assumed to be using RAT-2.

As discloses above, the network node 140*a* forwards the initiation for network access to the network node 140*b*. It is for illustrative purposes assumed that this forwarding of the initiation for network access is received by the network node 140*b*. Hence, the network node 140*b* is configured to perform step S302:

S302: The network node 140*b* receives, from the network node 140*a*, the initiation for network access to the communications network 100*a*, 100*b* from a wireless device 150 using RAT-1, where, as disclosed above, RAT-1 is different from RAT-2.

The network node 140*b* responds to the initiation for network access and is hence configured to perform step S304:

S304: The network node 140*b* responds, using RAT-2, to the initiation for network access to the wireless device 150. The network node 140*b* thereby enables network access of the wireless device 150 to the communications network 100*a*, 100*b*.

Figure 9:
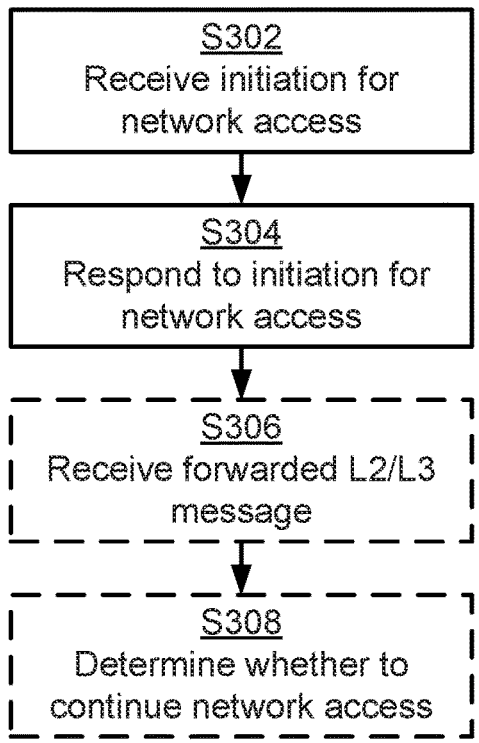

Reference is now made to FIG. 9 illustrating methods for network access of the wireless device 150 to the communications network 100*a*, 100*b* as performed by the network node 140*b* according to further embodiments. It is assumed that steps S302-S304 are performed as disclosed above.

As disclosed above, the network node 140*a* in step S212 forwards an L2/L3 message to the network node 140*b*. It is in an embodiment assumed that this L2/L3 message is received by the network node 140*b*. Hence, according to an embodiment the network node 140*b* is configured to perform step S306:

S306: The network node 140*b* receives a forwarded L2/L3 message from the network node 140*a*. As disclosed above, the forwarded L2/L3 message has (by the network node 140*a*) been forwarded from the wireless device 150.

The network node 140*b* may then, based on the received forwarded L2/L3 message determine whether to continue the network access procedure with the wireless device 150. Particularly, according to an embodiment the network node 140*b* is configured to perform step S308:

S308: The network node 140*b* determines, based on the received forwarded L2/L3 message, whether to continue enabling network access of the wireless device 150 to the communications network 100*a*, 100*b*.

Figure 10:
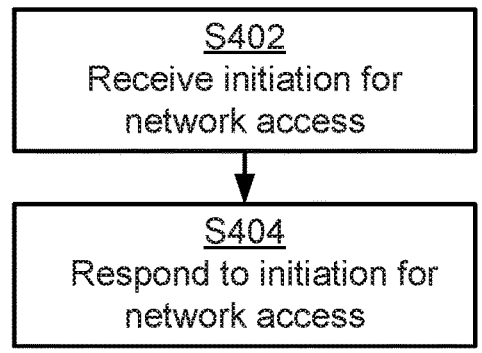

Reference is now made to FIG. 10 illustrating a method for network access of the wireless device 150 to the communications network 100*a*, 100*b* as performed by the network nodes 140*a*, 140*b* according to an embodiment.

As disclosed above, the wireless device 150 in step S102 initiates network access using RAT-1 to the communications network 100*a*, 100*b*. It is for illustrative purposes assumed that this initiation for network access is received by the network node 140*a*. Hence, the network node 140*a* is configured to perform step S402:

S402: The network node 140*a* receives, using RAT-1, the initiation for network access to the communications network 100*a*, 100*b* from the wireless device 150.

A response to the initiation for network access is then transmitted by network node 140*b* which hence is configured to perform step S404:

S404: The network node 140*b* responds, using RAT-2, where, as disclosed above, RAT-2 is different from RAT-1, to the initiation for network access to the wireless device 150. The network node 140*b* thereby enables network access of the wireless device 150 to the communications network 100*a*, 100*b*.

Embodiments representing optional features applicable to all above disclosed methods will now be disclosed.

There are different ways in which RAT-2 can differ from RAT-1. For example, RAT-1 and RAT-2 can use different frequency bands. Hence, according to an embodiment, RAT-1 and RAT-2 use mutually different frequency bands for communications with the wireless device 150. For example, RAT-1 and RAT-2 can have different latencies. Hence, according to an embodiment, RAT-1 and RAT-2 have mutually different response times for responding to the wireless device 150. For example, one of RAT-1 and RAT-2 can operate in licensed spectrum and the other in unlicensed spectrum. Hence, according to an embodiment, one of RAT-1 and RAT-2 operates in a licensed frequency band and the other of RAT-1 and RAT-2 operates in an unlicensed frequency band. Combinations of these embodiments are also foreseen.

There are different examples of network access procedures that the wireless device 150 and the network nodes 140*a*, 140*b* participate in. According to an embodiment the network access is part of a random access procedure. This random access procedure could be an LTE random access procedure. According to an embodiment the network access is part of a contention free access procedure. This random access procedure could be a random access procedure using an emerging RAT. According to an embodiment the network access is part of an access procedure using pre-configured dedicated resources. Other network access procedures such as carrier sense and listen before talk methods as e.g. used by Wi-Fi and LTE in unlicensed frequency bands also apply. In this sense, Wi-Fi is defined as any wireless local area network (WLAN) product based on the Institute of Electrical and Electronics Engineers' (IEEE) 802.11 standards.

Figure 3:
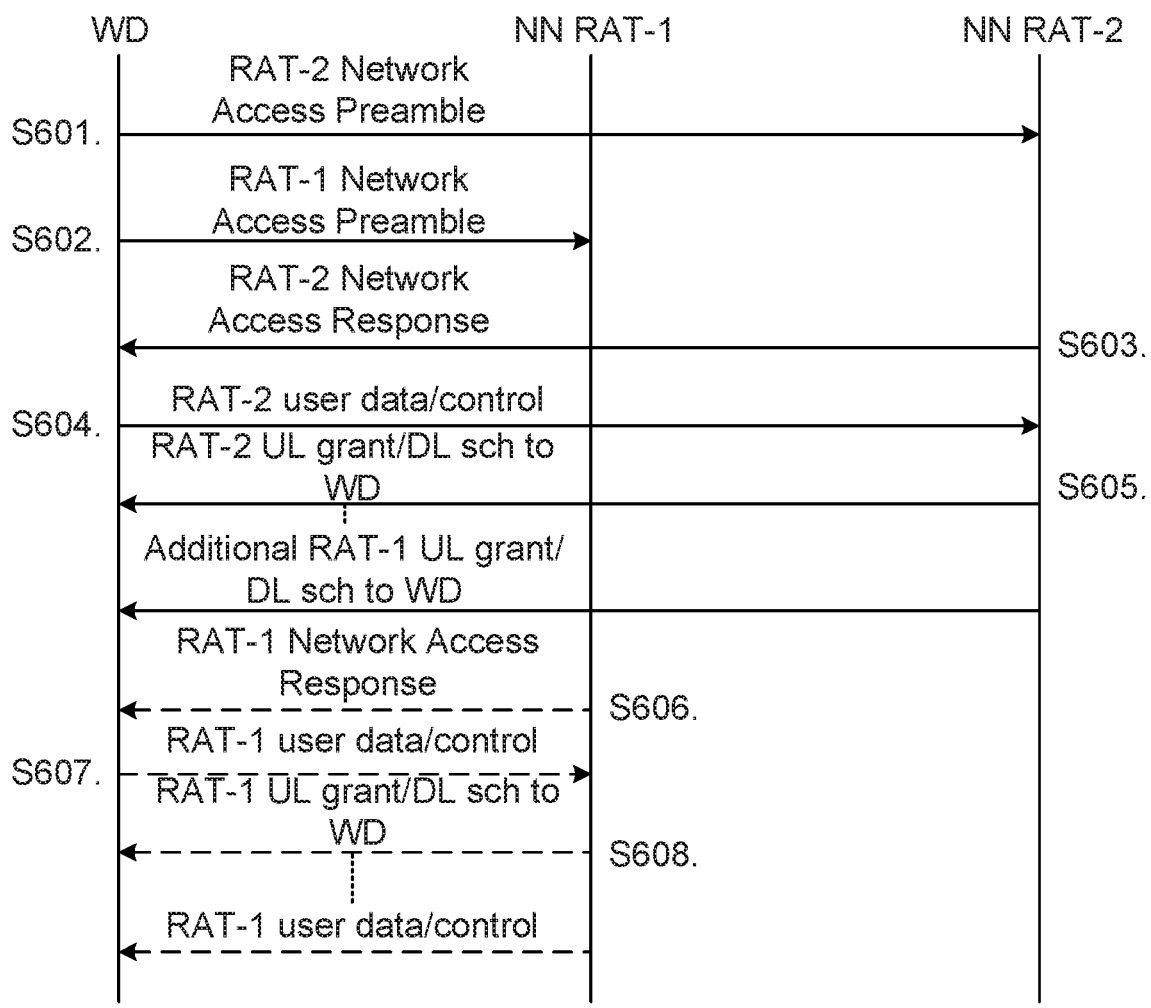
FIGS. 3, 11, 12, 13, and 14 are signalling diagrams according to embodiments.

One embodiment for network access of the wireless device 150 to the communications network 100*a*, 100*b* applied for a case where two RATs, RAT-1 and RAT-2, are available will now be disclosed. In this embodiment it is assumed that the RAT-2 network access procedure can be executed significantly faster than the RAT-1 network access procedure. Reference is made to the signaling diagram of FIG. 3 illustrating a network access procedure between a wireless device (WD) and a network node (NN) using RAT-1 and a network node (NN) using RAT-2.

S601: The wireless device 150 performs RAT-2 network access on RAT-2 resources by transmitting a RAT-2 preamble signature that may or may not be combined with L2/3 message and user data.

S602: The wireless device 150 performs RAT-1 network access on RAT-1 resources by transmitting a RAT-1 preamble signature.

The wireless device 150 may send the RAT-2 pre-amble signature and the RAT-1 pre-amble signature in parallel or in any order. In this respect, steps S601 and S602 can be performed at roughly the same time and allow the two different network access procedures to be concurrently executed until at least one network access response is received with good enough quality. The communications network 100a, 100b is enabled to continue with the slower of the network access procedures (such as the RAT-1 network access procedure) and eventually setup both RAT-1 and RAT-2 connections in parallel. The communications network 100a, 100b is enabled to switch RAT i.e., from network access using RAT-1 to network access using RAT-2 (or vice versa) during the network access procedure i.e. to start with a RAT-1 network access procedure but finish with a RAT-2 connection being established (or vice versa). In this respect, RAT-1 and RAT-2 will typically use different frequency and time resources. If the same frequency resources are used then typically the time resources are different, and vice versa. The wireless device 150 use broadcasted or stored information to understand which resources that are available for RAT-1 to network access and for RAT-2 to network access, respectively.

S603: The network node 140b transmits a network access response using RAT-2. This network access response is typically transmitted earlier than the network access response using RAT-1 from network node 140a (see, step S606). The wireless device 150 recognizes the RAT-2 network access response and continues the RAT-2 network access procedure.

S604: The wireless device 150 transmits user data and/or control signalling using RAT-2 to the network node 140b. The user data and/or control signalling comprises RAT-2 information such as identity information. The network node 140b recognizes that the wireless device 150 responded to the network access response transmitted in step S603.

S605: The network node 140b transmits, using RAT-2, an uplink grant or downlink scheduling to the wireless device 150. The network node 140b may give the wireless device 150 further grants to transmit on RAT-2 uplink resources and may also schedule further downlink data to the wireless device 150 using RAT-2. The network node 140b may also indicate that the wireless device 150 shall abort the RAT-2 network access procedure and that the wireless device 150 shall use a RAT-1 network access procedure instead.

S606: The network node 140a transmits a network access response using RAT-1. If the wireless device 150 already has started a RAT-2 network access procedure (which is assumed to be the case in this embodiment) this response is either ignored by the wireless device 150 or causes the wireless device 150 to transmit information back to the network node 140a, as in step S607 below.

S607: The wireless device 150 transmits user data and/or control signalling using RAT-1 to the network node 140a. The user data and/or control signalling comprises RAT-1 information such as identity information. The network node 140a recognizes that the wireless device 150 responded to the network access response transmitted in step S606. The user data and/or control signalling may also comprise information about the RAT-2 network access procedure, such as that a RAT-2 network access procedure is ongoing, that a RAT-2 network access procedure has failed, that RAT-2 network access procedure finished successfully, and/or RAT-2 radio quality.

S608: The network node 140a transmits, using RAT-1, an uplink grant or downlink scheduling to the wireless device 150 if dual, or multiple, connectivity is to be established. Hence, when performed, step S608 will grant the wireless device 150 to also use RAT-1 resources in parallel with RAT-2 resources.

Figure 11:
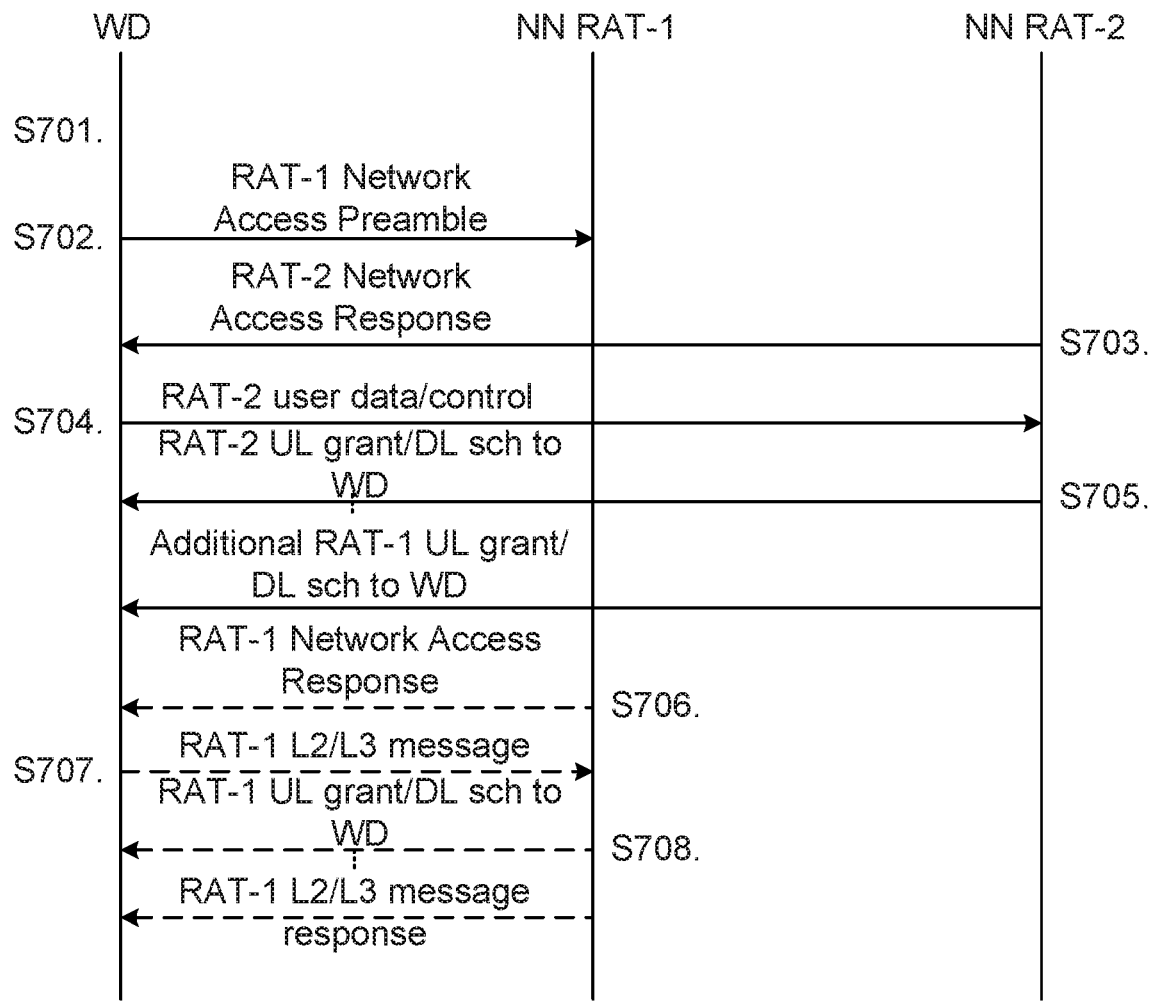

A first particular embodiment for network access of the wireless device 150 to the communications network 100a, 100b based on at least some of the above disclosed embodiments will now be disclosed in detail with reference to the signalling diagram of FIG. 11.

In this first particular embodiment a network access only using RAT-1 is initiated and responses using RAT-1 and RAT-2 are transmitted.

S701: The wireless device 150 refrains from initiating network access using RAT-2.

S702: The wireless device 150 initiates network access using RAT-1 by sending a RAT-1 preamble signature. The network node 140a is assumed to receive the initiation for network access using RAT-1 and forwards the initiation for network access to network node 140b.

S703: The network node 140b responds to the initiation for network access using RAT-2 by sending a network access response to the wireless device 150.

S704: The wireless device 150 transmits data and/or control signalling using RAT-2 to the network node 140b. The user data and/or control signaling comprises RAT-2 information such as identity information. The network node 140b thereby recognizes that the wireless device 150 responded to the network access response transmitted in step S703.

S705: The network node 140b transmits, using RAT-2, an uplink grant or downlink scheduling to the wireless device 150. The network node 140b may give the wireless device 150 further grants to transmit on RAT-2 uplink resources and may also schedule further downlink data to the wireless device 150 using RAT-2. The network node 140b may also indicate that the wireless device 150 shall continue the RAT-1 network access procedure and abort the RAT-2 network access procedure.

S706: The network node 140a responds to the initiation for network access using RAT-1 by sending a network access response to the wireless device 150.

The wireless device 150 can either ignore this response or send information back to network node 140a, as in step S707 below.

S707: The wireless device 150 transmits user data and/or control signalling using RAT-1 to the network node 140a. The user data and/or control signalling comprises RAT-1 information such as identity information. The network node 140a recognizes that the wireless device 150 responded to the network access response transmitted in step S706. The user data and/or control signalling may also comprise information about the RAT-2 network access procedure, such as that a RAT-2 network access procedure is ongoing, that a RAT-2 network access procedure has failed, that RAT-2 network access procedure finished successfully, and/or RAT-2 radio quality.

S708: The network node 140a transmits, using RAT-1, an uplink grant or downlink scheduling to the wireless device 150 if dual, or multiple, connectivity is to be established. Hence, when performed, step 7008 will grant the wireless device 150 to also use RAT-1 resources in parallel with RAT-2 resources.

Figure 12:
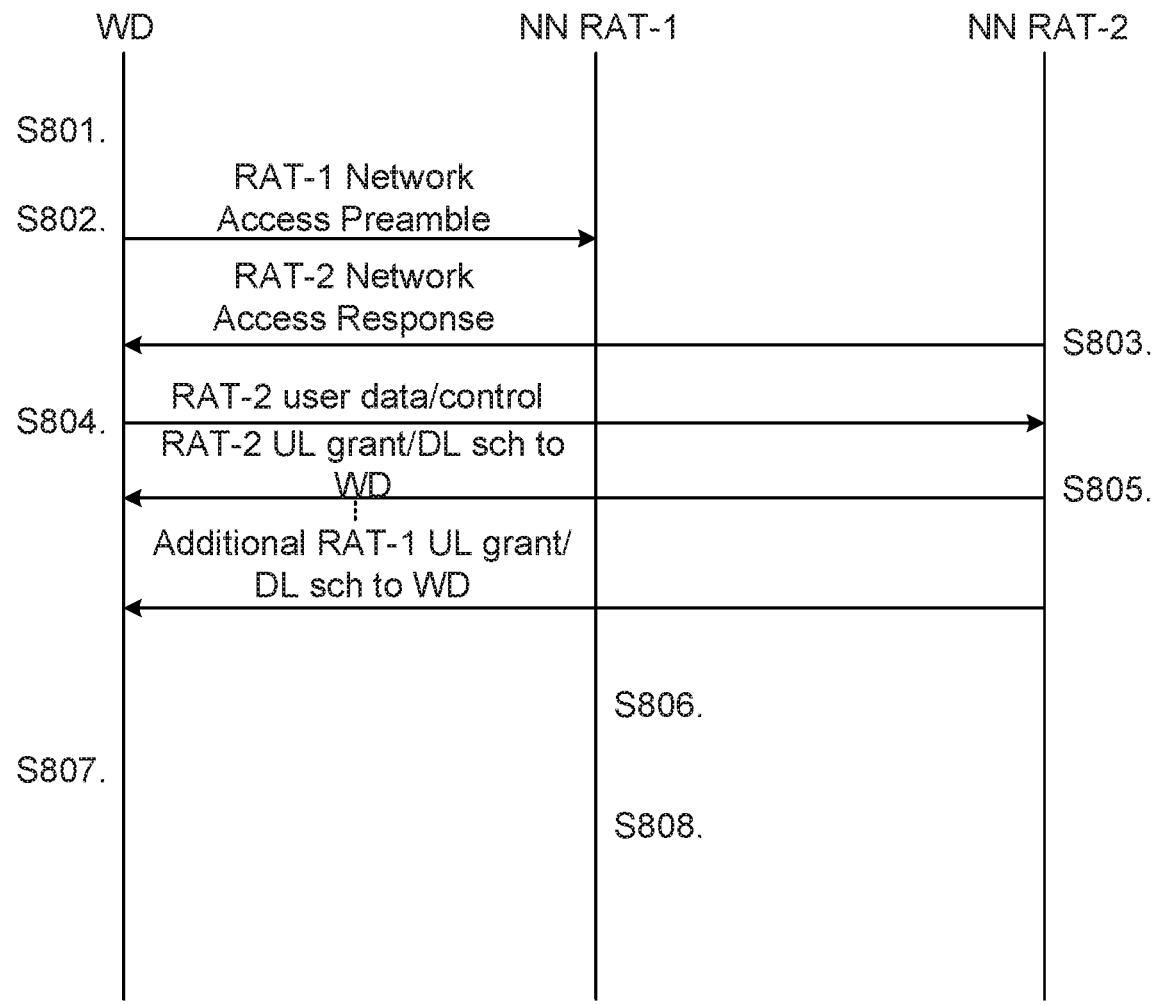

A second particular embodiment for network access of the wireless device 150 to the communications network 100a, 100b based on at least some of the above disclosed embodiments will now be disclosed in detail with reference to the signalling diagram of FIG. 12.

In this second particular embodiment a network access only using RAT-1 is initiated and responses using only RAT-2 is transmitted.

S801: The wireless device 150 refrains from initiating network access using RAT-2.

S802: The wireless device 150 initiates network access using RAT-1 by sending a RAT-1 preamble signature. The network node 140a is assumed to receive the initiation for network access using RAT-1 and forwards the initiation for network access to network node 140b.

S803: The network node 140b responds to the initiation for network access using RAT-2 by sending a network access response to the wireless device 150.

S804: The wireless device 150 transmits data and/or control signalling using RAT-2 to the network node 140b. The user data and/or control signaling comprises RAT-2 information such as identity information. The network node 140b thereby recognizes that the wireless device 150 responded to the network access response transmitted in step S803.

S805: The network node 140b transmits, using RAT-2, an uplink grant or downlink scheduling to the wireless device 150. The network node 140b may give the wireless device 150 further grants to transmit on RAT-2 uplink resources and may also schedule further downlink data to the wireless device 150 using RAT-2. The network node 140b may also indicate that the wireless device 150 shall continue the RAT-1 network access procedure and abort the RAT-2 network access procedure.

S806: The network node 140a refrains from responding to the initiation for network access.

S807: The wireless device 150 does not transmits user data or control signaling using RAT-1 to the network node 140a since no response is received in step S806.

S808: The network node 140a refrains from transmitting an uplink grant or downlink scheduling to the wireless device 150.

Figure 13:
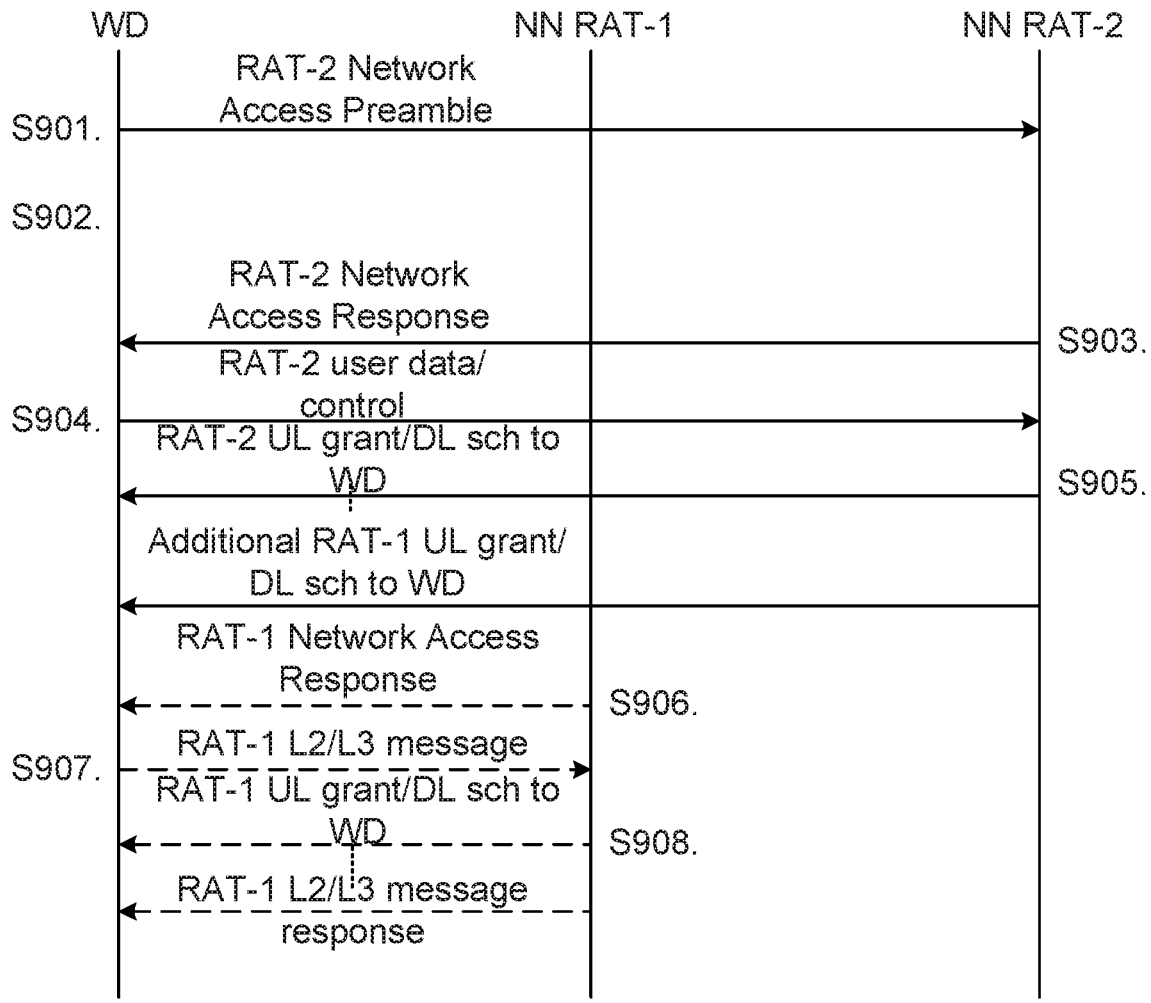

A third particular embodiment for network access of the wireless device 150 to the communications network 100a, 100b based on at least some of the above disclosed embodiments will now be disclosed in detail with reference to the signalling diagram of FIG. 13.

In this third particular embodiment a network access only using RAT-2 is initiated and responses using RAT-1 and RAT-2 are transmitted.

S901: The wireless device 150 initiates network access using RAT-2 by sending a RAT-2 preamble signature. The network node 140b is assumed to receive the initiation for network access using RAT-2 and forwards the initiation for network access to network node 140a.

S902: The wireless device 150 refrains from initiating network access using RAT-1.

S903: The network node 140b responds to the initiation for network access using RAT-2 by sending a network access response to the wireless device 150.

S904: The wireless device 150 transmits data and/or control signalling using RAT-2 to the network node 140b. The user data and/or control signaling comprises RAT-2 information such as identity information. The network node 140b thereby recognizes that the wireless device 150 responded to the network access response transmitted in step S903.

S905: The network node 140b transmits, using RAT-2, an uplink grant or downlink scheduling to the wireless device 150. The network node 140b may give the wireless device 150 further grants to transmit on RAT-2 uplink resources and may also schedule further downlink data to the wireless device 150 using RAT-2. The network node 140b may also indicate that the wireless device 150 shall continue the RAT-1 network access procedure and abort the RAT-2 network access procedure.

S906: The network node 140a responds to the initiation for network access using RAT-1 by sending a network access response to the wireless device 150.

The wireless device 150 can either ignore this response or send information back to network node 140a, as in step S907 below.

S907: The wireless device 150 transmits user data and/or control signaling using RAT-1 to the network node 140a. The user data and/or control signaling comprises RAT-1 information such as identity information. The network node 140a recognizes that the wireless device 150 responded to the network access response transmitted in step S906. The user data and/or control signaling may also comprise information about the RAT-2 network access procedure, such as that a RAT-2 network access procedure is ongoing, that a RAT-2 network access procedure has failed, that RAT-2 network access procedure finished successfully, and/or RAT-2 radio quality.

S908: The network node 140a transmits, using RAT-1, an uplink grant or downlink scheduling to the wireless device 150 if dual, or multiple, connectivity is to be established. Hence, when performed, step S908 will grant the wireless device 150 to also use RAT-1 resources in parallel with RAT-2 resources.

Figure 14:
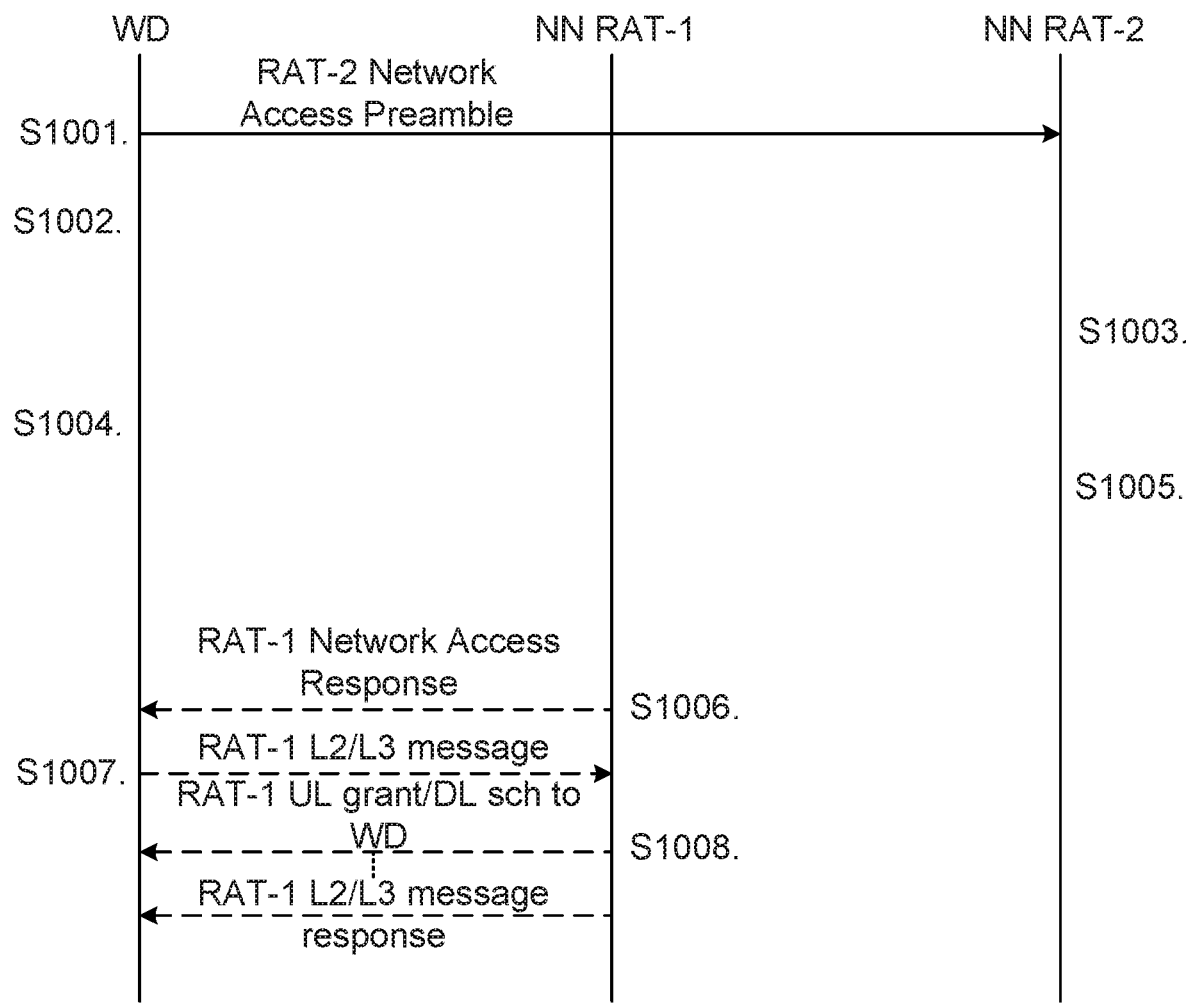

A fourth particular embodiment for network access of the wireless device 150 to the communications network 100a, 100b based on at least some of the above disclosed embodiments will now be disclosed in detail with reference to the signalling diagram of FIG. 14.

In this fourth particular embodiment a network access only using RAT-2 is initiated and responses using only RAT-1 is transmitted.

S1001: The wireless device 150 initiates network access using RAT-2 by sending a RAT-2 preamble signature. The network node 140b is assumed to receive the initiation for network access using RAT-2 and forwards the initiation for network access to network node 140a.

S1002: The wireless device 150 refrains from initiating network access using RAT-1.

S1003: The network node 140b refrains from responding to the initiation for network access.

S1004: The wireless device 150 does not transmits data and/or control signalling using RAT-2 to the network node 140b since no response is received in step S1003.

S1005: The network node 140b refrains from transmitting uplink grants and downlink scheduling to the wireless device 150.

S1006: The network node 140a responds to the initiation for network access using RAT-1 by sending a network access response to the wireless device 150. The wireless device 150 can either ignore this response or send information back to network node 140a, as in step S1007 below.

S1007: The wireless device 150 transmits user data and/or control signaling using RAT-1 to the network node 140a. The user data and/or control signaling comprises RAT-1 information such as identity information. The network node 140a recognizes that the wireless device 150 responded to the network access response transmitted in step S1006. The user data and/or control signaling may also comprise information about the RAT-2 network access procedure, such as that a RAT-2 network access procedure is ongoing, that a RAT-2 network access procedure has failed, that RAT-2 network access procedure finished successfully, and/or RAT-2 radio quality.

S1008: The network node 140a transmits, using RAT-1, an uplink grant or downlink scheduling to the wireless device 150. Hence step S1008 will grant the wireless device 150 to use RAT-1 resources.

Figure 15A:
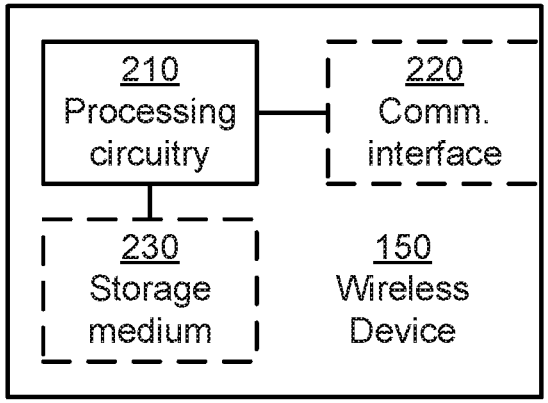
FIG. 15a is a schematic diagram showing functional units of a wireless device according to an embodiment.

FIG. 15a schematically illustrates, in terms of a number of functional units, the components of a wireless device 150 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 410a (as in FIG. 17), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 150 to perform a set of operations, or steps, S102-S116, as disclosed above. For example, the storage medium 230 may store the set of operations, and the processing circuitry 210 may be configured to retrieve the set of operations from the storage medium 230 to cause the wireless device 150 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 150 may further comprise a communications interface 220 for communications at least with the network nodes 140a, 140b. As such the communications interface 220 may comprise one or more transmitters and receivers, comprising analogue and digital components and a suitable number of antennas for wireless communications and ports for wireline communications.

The processing circuitry 210 controls the general operation of the wireless device 150 e.g. by sending data and control signals to the communications interface 220 and the storage medium 230, by receiving data and reports from the communications interface 220, and by retrieving data and instructions from the storage medium 230. Other components, as well as the related functionality, of the wireless device 150 are omitted in order not to obscure the concepts presented herein.

Figure 15B:
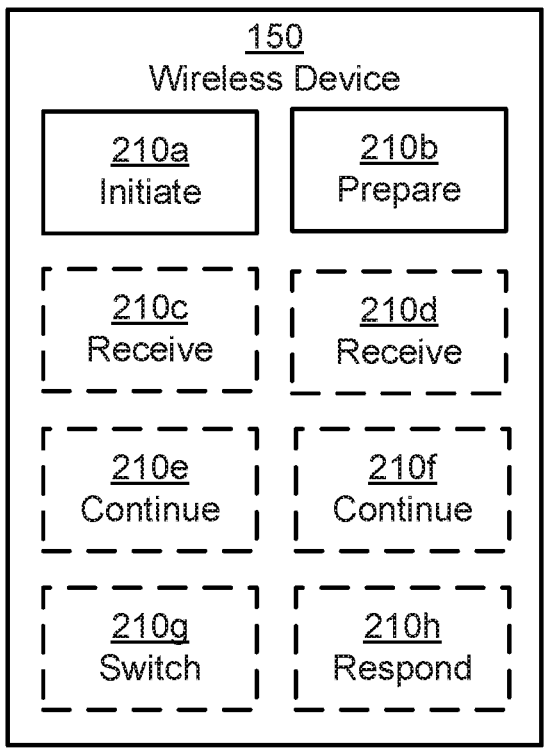
FIG. 15b is a schematic diagram showing functional modules of a wireless device according to an embodiment.

FIG. 15b schematically illustrates, in terms of a number of functional modules, the components of a wireless device 150 according to an embodiment. The wireless device 150 of FIG. 15b comprises a number of functional modules; an initiate module 210a configured to perform step S102, and a prepare module 210b configured to perform step S104. The wireless device 150 of FIG. 15b may further comprise a number of optional functional modules, such as any of a receive module 210c configured to perform step S106, a receive module 210d configured to perform step S108, a continue module 210e configured to perform step S110, a continue module 210f configured to perform step S114, a switch module 210g configured to perform step S114, and a respond module 210h configured to perform step S116.

In general terms, each functional module 210a-210h may be implemented in hardware or in software. Preferably, one or more or all functional modules 210a-210h may be implemented by the processing circuitry 210, possibly in cooperation with functional units 220 and/or 230. The processing circuitry 210 may thus be arranged to from the storage medium 230 fetch instructions as provided by a functional module 210a-210h and to execute these instructions, thereby performing any steps as will be disclosed hereinafter.

Figure 16A:
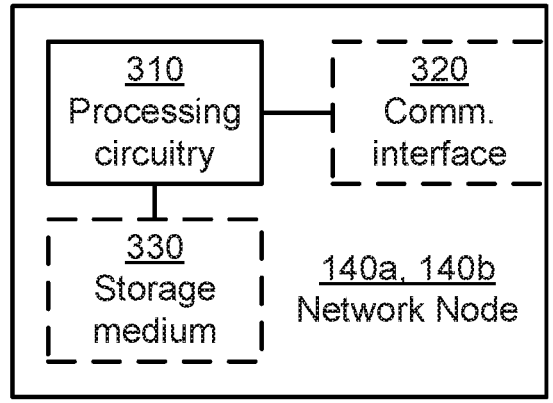
FIG. 16a is a schematic diagram showing functional units of a network node according to an embodiment.

FIG. 16a schematically illustrates, in terms of a number of functional units, the components of a network node 140a, 140b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b, 410c (as in FIG. 4), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 140a, 140b to perform a set of operations, or steps, S202-S212, S302-S306, S402-S404, as disclosed above. For example, the storage medium 330 may store the set of operations, and the processing circuitry 310 may be configured to retrieve the set of operations from the storage medium 330 to cause the network node 140a, 140b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 140a, 140b may further comprise a communications interface 320 for communications at least with the wireless device 150 and another network node 140a, 140b. As such the communications interface 320 may comprise one or more transmitters and receivers, comprising analogue and digital components and a suitable number of antennas for wireless communications and ports for wireline communications.

The processing circuitry 310 controls the general operation of the network node 140a, 140b e.g. by sending data and control signals to the communications interface 320 and the storage medium 330, by receiving data and reports from the communications interface 320, and by retrieving data and instructions from the storage medium 330. Other components, as well as the related functionality, of the network node 140a, 140b are omitted in order not to obscure the concepts presented herein.

Figure 16B:
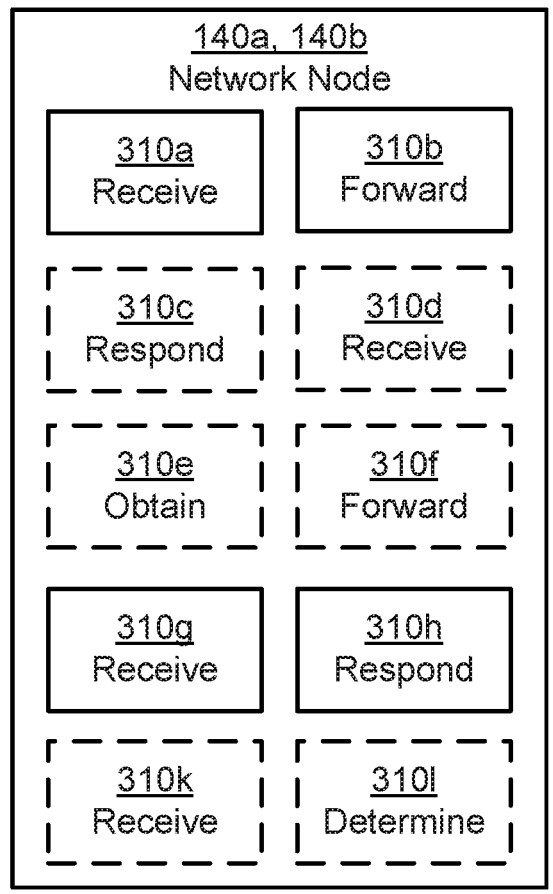
FIG. 16b is a schematic diagram showing functional modules of a network node according to an embodiment.

FIG. 16b schematically illustrates, in terms of a number of functional modules, the components of a network node 140a, 140b according to an embodiment. The network node 140a, 140b of FIG. 16b comprises a number of functional modules; a receive module 310a configured to perform steps S202, S402, a forward module 310b configured to perform step S204, a receive module 310g configured to perform step S302 and a respond module 310h configured to perform steps S304, S404. The network node 140a, 140b of FIG. 16b may further comprises a number of optional functional modules, such as any of a respond module 310c configured to perform step S206, a receive module 310d configured to perform step S208, an obtain module 310e configured to perform step S210, a forward module 310f configured to perform step S212, a receive module 310k configured to perform step S306, and a determine module 310l configured to perform step S308.

In general terms, each functional module 310a-310l may be implemented in hardware or in software. Preferably, one or more or all functional modules 310a-310l may be implemented by the processing circuitry 310, possibly in cooperation with functional units 320 and/or 330. The processing circuitry 310 may thus be arranged to from the storage medium 330 fetch instructions as provided by a functional module 310a-310l and to execute these instructions, thereby performing any steps as will be disclosed hereinafter.

Each network node 140a, 140b may be provided as a standalone device or as a part of at least one further device. Additionally, as noted above, the network nodes 140a, 140b may be regarded as logical nodes. For example, the network nodes 140a, 140b may be co-located and provided in a radio access network node of the radio access network 110, or separated and provided in separate such radio access network nodes of the radio access network 110. Alternatively, functionality of each of the network node 140a, 140b may be distributed between at least two devices, or nodes.

Thus, a first portion of the instructions performed by the network nodes 140a, 140b may be executed in a first device, and a second portion of the of the instructions performed by the network nodes 140a, 140b may be executed in a second device; the herein disclosed embodiments are not limited to any particular number of devices on which the instructions performed by the network nodes 140a, 140b may be executed. Hence, the methods according to the herein disclosed embodiments are suitable to be performed by network nodes 140a, 140b residing in a cloud computational environment. Therefore, although a single processing circuitry 310 is illustrated in FIG. 16a the processing circuitry 310 may be distributed among a plurality of devices, or nodes. The same applies to the functional modules 310a-310l of FIG. 16b and the computer programs 420b, 420c of FIG. 17 (see below).

Figure 17:
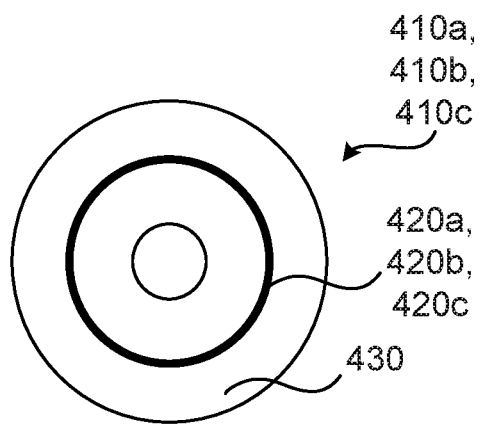
FIG. 17 shows one example of a computer program product comprising computer readable means according to an embodiment.

FIG. 17 shows one example of a computer program product 410a, 410b, 410c comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the wireless device 150 as herein disclosed. On this computer readable means 430, computer programs 420b, 420c can be stored, which computer programs 420b, 420c can cause the processing circuitry 310 and thereto operatively coupled entities and devices, such as the communications interface 320 and the storage medium 330, to execute methods according to embodiments described herein. The computer programs 420b, 420c and/or computer program products 410b, 410c may thus provide means for performing any steps of the network node 140a, 140b as herein disclosed.

In the example of FIG. 17, the computer program product 410a, 410b, 410c is illustrated as an optical disc, such as a CD (compact disc) or a DVD (digital versatile disc) or a Blu-Ray disc. The computer program product 410a, 410b, 410c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b, 420c is here schematically shown as a track on the depicted optical disk, the computer program 420a, 420b, 420c can be stored in any way which is suitable for the computer program product 410a, 410b, 410c.

In summary, the herein disclosed mechanisms for network access of the wireless device 150 to the communications network 100a, 100b allow multiple network access procedures having inherent different response times, e.g., due to different RAT being used, to be initiated by the wireless device 150 and executed concurrently. The herein disclosed mechanisms for network access of the wireless device 150 to the communications network 100a, 100b allow the wireless device 150 (or at least one of the network nodes 140a, 140b) to select and respond or even change RAT during the network access procedure. For example, the wireless device 150 can respond to the network node 140a, 140b from which the fastest response is received and establish a connection to the RAT of that network node without delay. The herein disclosed mechanisms for network access of the wireless device 150 to the communications network 100a, 100b allow also the network access procedure using the slower RAT to eventually be completed and hence allow multiple connections to be setup in parallel. The network access procedure(s) selected by the wireless device 150 to continue with can be based on the order of the response(s) received, priority of RAT, and/or the quality of the network access response signal.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although RAT-1 has been used as synonym to the first radio access technology and RAT-2 has been used as synonym to the second radio access technology, the herein disclosed embodiments are not limited to such relations. For example, as noted above, one example of a radio access technology that could be used as either RAT-1 or RAT-2 is LTE radio access and hence, if LTE radio access is used as RAT-1 then another radio access technology is used as RAT-2, and vice versa.

The invention claimed is:

1. A method for network access of a wireless device to a communications network, the method being performed by the wireless device, the method comprising:
   initiating network access by transmitting a network access preamble using a first radio access technology to the communications network; and
   monitoring a first network node in the communications network using a first radio access technology and a second network node in the communications network using a second radio access technology for a response to the transmitted network access preamble, said second radio access technology comprising a radio access technology for which the wireless device has not initiated network access;
   wherein the first and second radio access technologies are different cellular radio access technologies.

2. The method of claim 1, further comprising receiving the response to the network access from the second network node using the second radio access technology.

3. The method of claim 2, further comprising responding to the response by transmitting user data or control signaling to the second network node using the second radio access technology.

4. The method of claim 1, further comprising receiving the response to the network access from the first network node in the communications network using the first radio access technology.

5. The method of claim 1, further comprising:
receiving the response to the network access from the second network node using the second radio access technology;
receiving the response to the network access from the first network node in the communications network using the first radio access technology; and
continuing the network access using both the first radio access technology and the second radio access technology.

6. The method of claim 1, further comprising:
at least one of receiving the response to the network access from the second network node using the second radio access technology and receiving the response to the network access from the first network node in the communications network using the first radio access technology; and
continuing the network access using only one of the first radio access technology and the second radio access technology.

7. The method of claim 6, wherein which one of the first radio access technology and the second radio access technology to continue the network access with is based on at least one of order in which responses are received, mutual priority of the radio access technologies, and received signal quality in the received responses.

8. The method of claim 7, further comprising switching the network access from one of the first radio access technology and the second radio access technology to the other of the first radio access technology and the second radio access technology.

9. The method of claim 1, wherein the first radio access technology and the second radio access technology use mutually different frequency bands for communications with the wireless device.

10. The method of claim 1, wherein the first radio access technology and the second radio access technology have mutually different response times for responding to the wireless device.

11. The method of claim 1, wherein one of the first radio access technology and the second radio access technology operates in a licensed frequency band and wherein the other of the first radio access technology and the second radio access technology operates in an unlicensed frequency band.

12. The method of claim 1, wherein the network access is part of a random access procedure.

13. The method of claim 1, wherein the network access is part of a contention free access procedure.

14. The method of claim 1, wherein the network access is part of an access procedure using pre-configured dedicated resources.

15. A method for network access of a wireless device to a communications network, the method being performed by a network node using a first radio access technology, the method comprising:
receiving a network access preamble associated with an initiation for network access to the communications network from the wireless device using the first radio access technology;
forwarding the initiation for network access to the communications network to another network node, the another network node using a second radio access technology for which the wireless device has not initiated network access; and
responding to the initiation for network access to the wireless device using the first radio access technology, thereby enabling network access of the wireless device to the communications network;
wherein the first and second radio access technologies are different cellular radio access technologies for communications with the wireless device.

16. The method of claim 15, wherein the initiation for network access is forwarded on a network node external interface.

17. The method of claim 15, wherein the initiation for network access is forwarded on an internal interface.

18. The method of claim 15, further comprising:
receiving a protocol layer 2 or protocol layer 3 message from the wireless device in response to having responded to the initiation; and
wherein forwarding the initiation for network access comprises forwarding the protocol layer 2 or protocol layer 3 message to the another network node.

19. The method of claim 18:
further comprising obtaining a quality measure of the received protocol layer 2 or protocol layer 3 message; and
wherein the protocol layer 2 or protocol layer 3 message forwarded to the another network node comprises the quality measure.

20. A method for network access of a wireless device to a communications network, the method being performed by a network node using a second radio access technology, the method comprising:
monitoring by use of the second radio access technology receipt of any network access preambles from one or more wireless devices, said second radio access technology comprising a radio access technology for which the wireless device has not initiated network access;
receiving, from another network node, an initiation for network access to the communications network, the received initiation for network access associated with a network access preamble sent from the wireless device using a first radio access technology to the another network node; and
sending a response to the received initiation for network access to the communications network to the wireless device using the second radio access technology, thereby enabling network access of the wireless device to the communications network;
wherein the first and second radio access technologies are different cellular radio access technologies.

21. The method of claim 20, further comprising receiving a forwarded protocol layer 2 or protocol layer 3 message from the another network node, the forwarded protocol layer 2 or protocol layer 3 message having been sent to the another network node by the wireless device.

22. The method of claim 21, further comprising determining, based on the received forwarded protocol layer 2 or protocol layer 3 message, whether to continue enabling network access of the wireless device to the communications network.

23. A method for network access of a wireless device to a communications network, the method comprising:
receiving, by a first network node in the communications network using a first radio access technology, a network access preamble associated with an initiation for network access to the communications network from the wireless device; and receiving, by a second network node in the communications network using a second radio access technology for which the wireless device has not initiated network access, the initiation for network access to the communications network for the wireless device from the first network node;

sending, by the second network node, a response to the received initiation to the wireless device, thereby enabling network access of the wireless device to the communications network;

wherein the first and second radio access technologies are different cellular radio access technologies.

24. A wireless device for network access of the wireless device to a communications network, the wireless device comprising:

processing circuitry;

memory, the memory containing instructions executable by the processing circuitry whereby the wireless device is configured to:

initiate network access by transmitting a network access preamble using a first radio access technology to the communications network; and monitor a first network node in the communications network using a first radio access technology and a second network node in the communications network using a second radio access technology for a response to the transmitted network access preamble, said second radio access technology comprising a radio access technology for which the wireless device has not initiated network access;

wherein the first and second radio access technologies are different cellular radio access technologies.

25. A network node using a first radio access technology for network access of a wireless device to a communications network, the network node comprising:

processing circuitry;

memory, the memory containing instructions executable by the processing circuitry whereby the network node is configured to:

receive a network access preamble associated with an initiation for network access to the communications network from the wireless device using the first radio access technology;

forward the initiation for network access to the communications network to another network node, the another network node using a second radio access technology for which the wireless device has not initiated network access; and respond to the initiation for network access to the wireless device using the first radio access technology, thereby enabling network access of the wireless device to the communications network;

wherein the first and second radio access technologies are different cellular radio access technologies for communications with the wireless device.

26. A network node using a second radio access technology for network access of a wireless device to a communications network, the network node comprising:

processing circuitry;

memory, the memory containing instructions executable by the processing circuitry whereby the network node is configured to:

monitor, by use of the second radio access technology for which the wireless device has not initiated network access, receipt of any network access preambles from one or more wireless devices;

receive, from another network node, an initiation for network access to the communications network, the received initiation for network access associated with a network access preamble sent from the wireless device using a first radio access technology to the another network node; and send a response to the received initiation for network access to the communications network to the wireless device using the second radio access technology, thereby enabling network access of the wireless device to the communications network;

wherein the first and second radio access technologies are different cellular radio access technologies.

27. A computer program product stored in a non-transitory computer readable medium for controlling network access of a wireless device to a communications network, the computer program product comprising software instructions which, when run on processing circuitry of the wireless device, causes the wireless device to:

initiate network access by transmitting a network access preamble using a first radio access technology to the communications network; and monitor a first network node in the communications network using a first radio access technology and a second network node in the communications network using a second radio access technology for a response to the transmitted network access preamble, said second radio access technology comprising a radio access technology for which the wireless device has not initiated network access;

wherein the first and second radio access technologies are different cellular radio access technologies.

28. A computer program product stored in a non-transitory computer readable medium for controlling network access of a wireless device to a communications network, the computer program product comprising software instructions which, when run on processing circuitry of a network node using a first access technology, causes the network node to:

receive a network access preamble associated with an initiation for network access to the communications network from the wireless device using the first radio access technology;

forward the initiation for network access to the communications network to another network node, the another network node using a second radio access technology for which the wireless device has not initiated network access; and respond to the initiation for network access to the wireless device using the first radio access technology, thereby enabling network access of the wireless device to the communications network;

wherein the first and second radio access technologies are different cellular radio access technologies for communications with the wireless device.

29. A computer program product stored in a non-transitory computer readable medium for controlling network access of a wireless device to a communications network, the computer program product comprising software instructions which, when run on processing circuitry of a network node using a second radio access technology, causes the network node to:

monitor by use of the second radio access technology receipt of any network access preambles from one or more wireless devices, said second radio access technology comprising a radio access technology for which the wireless device has not initiated network access;

receive, from another network node, an initiation for network access to the communications network, the received initiation for network access associated with a network access preamble sent from the wireless device using a first radio access technology to the another network node; and send a response to the initiation for network access to the communications network to the wireless device using the second radio access technology, thereby enabling network access of the wireless device to the communications network;

wherein the first and second radio access technologies are different cellular radio access technologies.

* * * * *